United States Patent
Carbonini

(10) Patent No.: US 9,495,616 B2
(45) Date of Patent: Nov. 15, 2016

(54) SYSTEM FOR MONITORING COFFEE MACHINES AND CORRESPONDING MONITORING METHOD

(71) Applicant: RANCILIO GROUP S.P.A., Villastanza di Parabiago (Milano) (IT)

(72) Inventor: Carlo Carbonini, Villastanza di Parabiago (IT)

(73) Assignee: Rancilio Group S.P.A., Villastanza di Parabiago (Milano) (IT)

( * ) Notice: Subject to any disclaimer, the term of this patent is extended or adjusted under 35 U.S.C. 154(b) by 0 days.

(21) Appl. No.: 14/437,896

(22) PCT Filed: Oct. 25, 2013

(86) PCT No.: PCT/IB2013/059643
§ 371 (c)(1),
(2) Date: Apr. 23, 2015

(87) PCT Pub. No.: WO2014/064647
PCT Pub. Date: May 1, 2014

(65) Prior Publication Data
US 2015/0286895 A1 Oct. 8, 2015

(30) Foreign Application Priority Data
Oct. 26, 2012 (IT) .............. TO2012A00942

(51) Int. Cl.
| G06F 17/00 | (2006.01) |
| G06K 9/62 | (2006.01) |
| G06Q 10/00 | (2012.01) |
| G06Q 20/32 | (2012.01) |
| G07F 9/02 | (2006.01) |
| G06F 3/0484 | (2013.01) |
| H04L 12/58 | (2006.01) |
| H04W 4/02 | (2009.01) |

(52) U.S. Cl.
CPC ......... *G06K 9/6217* (2013.01); *G06F 3/04842* (2013.01); *G06Q 10/20* (2013.01); *G06Q 20/3276* (2013.01); *G07F 9/026* (2013.01); *H04L 51/22* (2013.01); *H04W 4/02* (2013.01)

(58) Field of Classification Search
CPC ................... A47J 31/4403; G06K 19/06028; G06Q 10/20; G06Q 20/3274; G06Q 20/3276
See application file for complete search history.

(56) References Cited

U.S. PATENT DOCUMENTS

| 6,862,494 B2 | 3/2005 | Hu et al. | |
| 2010/0191369 A1* | 7/2010 | Kim .................. | G07F 5/18 700/235 |

(Continued)

FOREIGN PATENT DOCUMENTS

DE 102010054374 A1 6/2012

OTHER PUBLICATIONS

Aigner et al. "Hot Beverage Preparation Device Comprising a Data Transmission Unit". May 16, 2012. English translation of DE 10 2010 043 858. pp. 1-8.*

*Primary Examiner* — Thien M Le
*Assistant Examiner* — Asifa Habib
(74) *Attorney, Agent, or Firm* — Howson & Howson, LLP

(57) ABSTRACT

A system for monitoring coffee machines, comprising: a coffee machine (10) having an electronic circuitry (14, 40, 41) configured for collecting and storing usage parameters of the machine; and a display (12) connected to the electronic circuitry and configured for displaying information processed by the electronic circuitry (14, 40, 41) in the form bar codes of QR code type. The system includes a device (50) external to the machine (10) and configured for acquiring through photographs the processed information, in order to decode it and transmit it to a remote server (15). A method of for monitoring coffee machines is also described.

12 Claims, 2 Drawing Sheets

(56) References Cited

U.S. PATENT DOCUMENTS

| | | |
|---|---|---|
| 2011/0309137 A1 | 12/2011 | Votaw et al. |
| 2012/0168510 A1 | 7/2012 | Gratton |
| 2012/0240780 A1 | 9/2012 | Delbreil et al. |
| 2013/0220135 A1* | 8/2013 | Aigner ................ A47J 31/4492 99/285 |
| 2013/0247218 A1* | 9/2013 | Jhingan .................. G06F 21/36 726/27 |

* cited by examiner

SYSTEM FOR MONITORING COFFEE MACHINES AND CORRESPONDING MONITORING METHOD

TECHNICAL FIELD

The present invention generally relates to a system for monitoring coffee machines and to a corresponding monitoring method.

More particularly, the present invention relates to a system comprising one or more coffee machines arranged to be remotely monitored.

PRIOR ART

In the field of refreshment machines, in particular coffee machines, the need is known to monitor information related to the operation of such machines by both the machine manufacturer and the machine maintenance people or the machine user.

Information to be monitored can be for instance:

installation data, such as installation date and place;

activity data, such as machine on, machine off, wholly operating machine, partly operating machine;

maintenance data, such as interventions carried out, dates of ordinary or extraordinary maintenance interventions, alarms detected, either solved or unsolved;

statistical data, such as number and type of products supplied.

The above list, depending on the kind of machine, use, management or market, can be expanded to include further information possibly managed by the machine.

Generally, such a need has been met according to two working schemes that can be described as follows:

1° manual collection of the information from the machine and filling in of forms by the maintenance technicians or the final users; such forms are manually filled in and they may be in paper form or in electronic form, depending on the transmission mode, for instance transmission by fax or by e-mail;

2° automatic or semi-automatic collection of the information and transmission of such information to the manufacturer by using different connection technologies, such as GSM, GPRS, Wi-Fi or LAN network, and communication modes such as SMS or Internet; in such a working scheme, the machine is to be equipped with devices for remote connection capable of connecting themselves to a "receiving" unit (server) and of transmitting the information, and the server is generally to contain a database to which the manufacturer has access in order to check the information received.

Both schemes have limits and problems.

In the first case the manual filling in demands an effort from the technician or the user, which effort is generally unwelcome and can give rise to transcription errors and/or to incompleteness as to the collected data. Moreover, the manual filling in entails a waste of time that no doubt is unwelcome to the technician or the user.

In the second case, the most important problem is that the machine is to be equipped with additional hardware and software, whereby it becomes more complex and expensive.

In this second case, the further problem exists that the provision of connection tools and modes may be difficult, for instance because of factors such as unavailability of connection networks or connection standards in the installation areas, and so on.

In a field close to the field of the invention, in particular in the field of food preparation, the possibility is known of associating the foods with cooking information by means of bar codes applied to the foods themselves and/or their packaging.

For instance, U.S. Pat. No. 6,862,494 discloses an automatic cooking system in which a cooking oven is equipped with a bar code reader arranged to recognise respective bar codes applied to the individual foods to be cooked.

In the known system, the bar codes include information arranged to enable the oven to have access, for instance, to a remote server in which the food cooking information is stored.

The cooking information stored in the server can thus be received by the oven in order to enable an optimum food cooking.

Also in accordance with such a kind of prior art the oven is to be equipped with hardware and software arranged to connect the oven to a remote server that, in this case, is configured so as to enable access to the cooking information.

Generally speaking, the Applicant has realised that the prior art teaches either manual ways of collecting the machine information, or ways in which the machine itself comprises hardware and software devices for remote connection to a server.

In synthesis, the Applicant has realised that both in view of the need to transmit information to the machine manufacturer, and in view of the need for the machine to receive information, the prior art teaches equipping the machine with hardware and software arranged to allow the information exchange.

According to the Applicant, such a solution seems to entail, besides problems of additional manufacturing costs, also problems of machine complexity, due to additional hardware and software to be installed on each machine, and problems of connection complexity, due for instance to the area where the machine is installed, since a given kind of connection technique might be utilisable in a given country and not in another one.

DESCRIPTION OF THE INVENTION

It is an object of the present invention to overcome the problems mentioned above of the prior art without any burden of manual activities for the collection of information.

According to the present invention, the above object is achieved by a system for monitoring coffee machines, and a method of monitoring same, having the features set forth in the appended claims.

The claims are integral part of the technical teaching provided herein in respect of the invention.

The following synthetic description of the invention is given in order to provide a basic understanding of some aspects of the invention.

Such a synthetic description is not a thorough description and, as such, it is not to be intended as being suitable for identifying key or critical elements of the invention or for defining the scope of the invention. It is only aimed at setting forth some concepts of the invention in simplified manner, as an anticipation of the detailed description below.

In accordance with a feature of a preferred embodiment, the system includes coffee machines configured for collecting, storing and displaying, in the form of one or more QR codes, usage parameters of the machine, and devices arranged to acquire, through photographs, the one or more QR codes, to decode the one or more QR codes and to transmit them to a central unit, for instance a management server, in which the data can be stored and analysed, even at a later time.

In accordance with a further feature of the present invention, the usage parameters are supplemented, before being transmitted, with information available to the devices and not included among the usage parameters of the machine.

BRIEF DESCRIPTION OF THE FIGURES

The above and other features and advantages of the present invention will become apparent from the following description of preferred embodiments made by way of a non-limiting example with reference to the accompanying Figures, in which elements denoted by a same or similar numerical reference correspond to components having the same or similar function and construction, and in which:

FIG. 1b schematically shows a detail of the system shown in FIG. 1a; and

FIG. 2 is a flow chart of the operation of the machine shown in FIG. 1a.

DESCRIPTION OF PREFERRED EMBODIMENTS

Figure 1A:
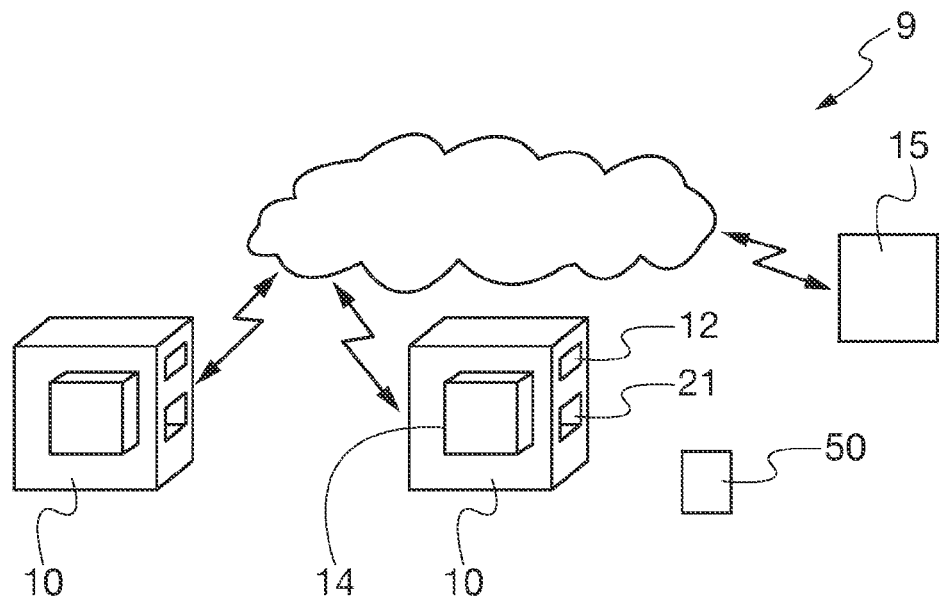
FIG. 1a schematically shows a system for monitoring coffee machines.
Figure 1B:
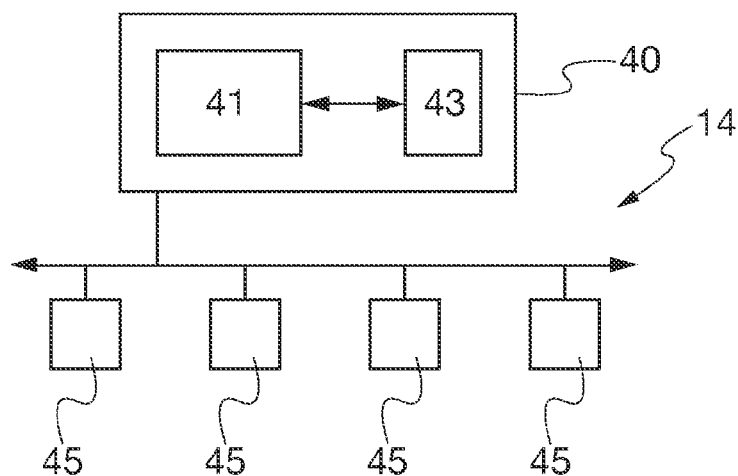
Figure 2:
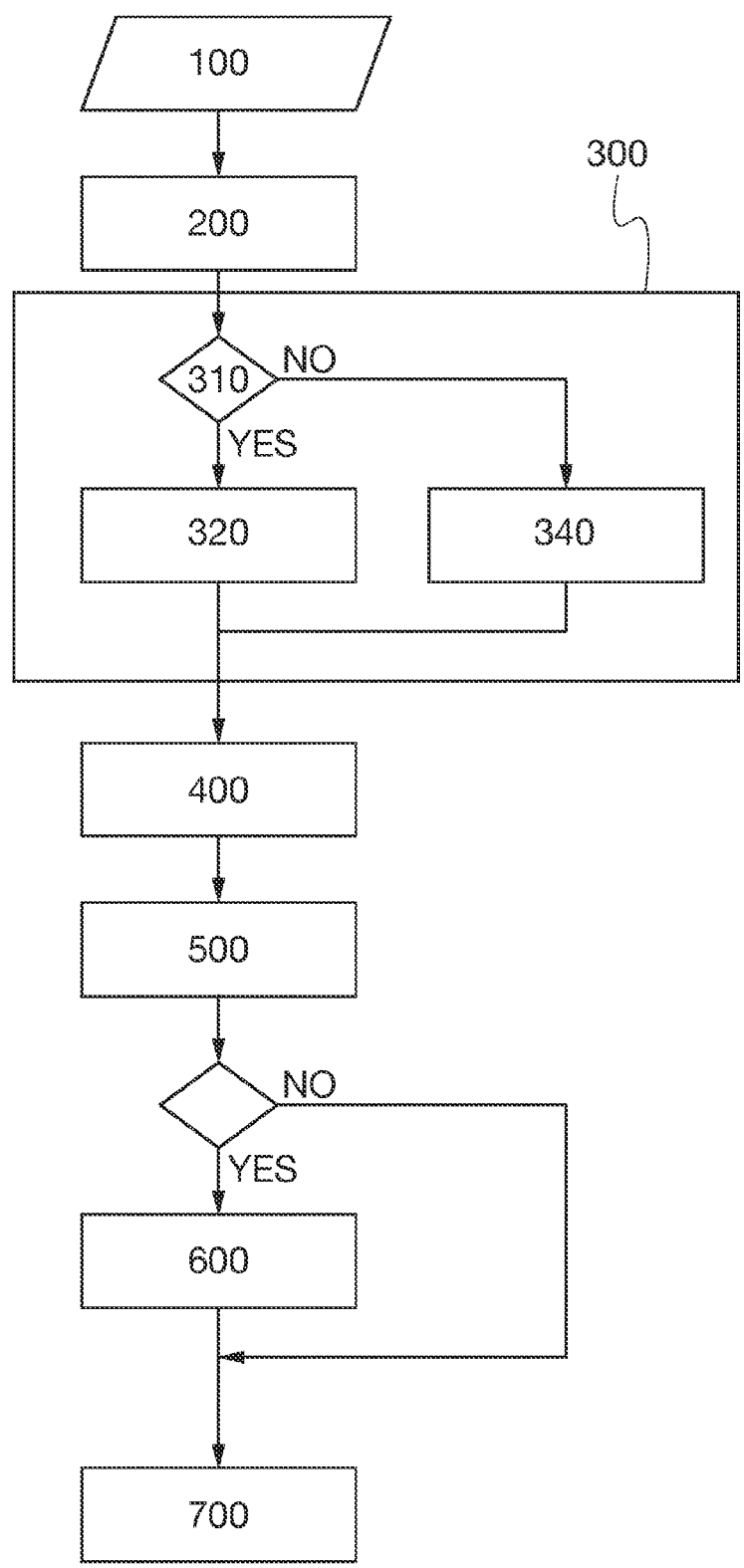

Referring to FIG. 1, a system for monitoring coffee machines (system) 9 comprises at least one coffee machine 10, having at least one display 12 visible externally to the machine, and at least one device 50 external to the machine and arranged to recognise and decode information collected from the machine and to transmit it, for instance through a geographical network of known type, to a central unit 15, for instance a remote server.

Device 50 may be for instance a device of the smart-phone type, known per se.

Coffee machine (machine) 10, in accordance with the preferred embodiment, includes, besides display 12, one or more supplying devices 21, for instance devices supplying espresso coffee and devices supplying steam and/or hot water, and an internal electronic circuitry 14 arranged, by means of a bus of known type, to collect and store information (data) obtained from suitable detectors 45 located in correspondence of various devices installed in machine 10, such as boilers, temperature detectors, supply detectors, and so on.

The information collected by the electronic circuitry concerns, for instance, usage parameters of the machine itself, such as the parameters listed below, the list being however non exhaustive:

supply data, such as number and kind of products supplied;

diagnostic data, such as warnings concerning components interested by failures or errors or warnings concerning situations of irregular operation, such as for instance temperatures higher than the maximum limits or lower than the minimum limits set for the machine;

machine setting data, such as serial number of the machine or reference addresses of sites to which the collected information is to be transmitted;

maintenance data, such as number of ordinary or extraordinary maintenance interventions effected and dates of the interventions;

statistical data, such as number and kind of products supplied.

Of course, the number and the type of data being collected can be different depending on the kind of machine to be monitored.

Display 12 is for instance a monochromatic graphical display, for instance with a 64×64 pixel resolution, or, in the alternative, a colour display, for instance with 640×480 pixel resolution.

Of course, depending on the embodiments, the display may even have higher or lower resolutions than the ones indicated above, without thereby departing from the scope of what is disclosed and claimed.

In accordance with the preferred embodiment, display 12 is arranged to display bar codes representing the usage parameters of the machine or a subset of such parameters.

More particularly, display 12 is arranged to display graphical elements representing bar codes of known type, for instance of the QR (Quick Response) code type, to which reference is made hereinafter for the sake of convenience of description.

A QR code is a two-dimensional bar code (or 2D code), i.e. a matrix code, formed of black modules arranged within a frame containing no character or sign. In a single cryptogram, for instance a cryptogram according to standard ISO/IEC 18004 or to standard JIS X 5010, up to 7089 numerical characters or 4296 alpha-numerical characters can be contained.

By means of the QR code it is possible to encode alphanumerical information in a standard graphical format, so that an optical reader, for instance the camera of a smart-phone, can decode the information contained in the code.

In accordance with the present exemplary embodiment, in case of a 64×64 pixel display in which the QR code is enclosed, the information may comprise a string of about 100 alpha-numerical characters.

In case of a 640×480 pixel graphical display in which the QR code is enclosed, for instance in a square, the information may comprise a string of 4296 alpha-numerical characters, corresponding to the maximum number of characters admissible in the cryptogram.

As a skilled in the art can readily understand, besides the size in pixels of display 12, also the resolution of smart-phone 50 (in this case, the resolution of the smart-phone camera) and the distance of smart-phone 50 from machine display 12 during the acquisition phase (which is here assumed to be in the range from about 20 cm to about 50 cm) are important.

Yet, taking into account that, generally, the cameras at present in use in smart-phones have an acquisition resolution of at least 2 Megapixels, it is assumed here that such a resolution is more than sufficient in order to acquire QR codes with a side about 3 cm long, including the frame provided for by the standard for such codes, thereby enabling decoding strings of about 100 characters.

In any case, taking into account the graphical displays assumed, by using a smart-phone of common use, the Applicant has verified that the minimum amount of data that can be acquired is at least 100 characters.

Of course, as the resolution of the camera increases, also the number of alpha-numerical characters that can be acquired for a given geometrical size increases. For instance, by using a camera with 5 Megapixel resolution, it is possible to acquire even more than 500 characters in a QR code with side 3 cm long.

Electronic circuitry 14 is connected to display 12 and, for instance, it consists of a microprocessor circuit 40 including a microprocessor 41 of known type connected to a plurality of diagnosis and/or control devices, of both hardware and software type, and it is arranged to receive the diagnosis and/or control information from said devices and to store it into a memory 43. For instance, storage is effected initially into an RAM memory and periodically into a non volatile memory, for instance an EEPROM (Electrically Erasable and Programmable Read Only Memory).

More particularly, in accordance with the present exemplary embodiment, when an abnormal situation occurs in machine 10, such a situation is stored by microprocessor 41 into a corresponding ad hoc register, together with a specific code capable of identifying the kind of trouble (warning), such as for instance:

code W39: electrically controlled supply valve in short-circuit;

code W40: too high temperature of the coffee boiler;

etc.

Preferably, depending on the operating situation occurring, microprocessor 41 can also perform different actions, such as for instance:

preventing supplying certain kinds of beverages for which the raw matter is lacking, for instance, because of the lack of milk, and storing such a condition into memory 43; and/or completely stopping machine 10 since a potential damage, even serious, of the machine itself exists, and storing such a condition into memory 43.

Preferably, moreover, all beverages that can be supplied are characterised by a set of parameters, such as for instance parameters selected out of:

amount of water, coffee, milk, etc.;

supply temperature;

supply pressure;

and such parameters are stored by microprocessor 41 of machine 10 into dedicated registers in memory 43.

Preferably, moreover, besides the usage parameters of the machine, already mentioned, other data are stored by the machine microprocessor, such as for instance the date at which the first beverage has been prepared, the serial number of the machine, the name of the technician who installed the machine and so on.

Microprocessor circuit 40 includes, for instance, a 16-bit microprocessor or CPU in case of monochromatic displays, or a 32-bit, ARM technology, CPU in case of colour displays, and it is connected, in known manner, to display 12 that, in accordance with the present exemplary embodiment, must preferably have a minimum resolution of 64×64 pixels.

In particular, In accordance with the present exemplary embodiment, microprocessor circuit 40 is configured so as to display on display 12 of machine 10 a menu where a user may select the usage parameters of the machine or a subset of such parameters.

Moreover, microprocessor circuit 40 is configured so as to encode the selected machine parameters in the form of QR code.

Even more particularly, in the preferred embodiment, microprocessor circuit 40 is arranged to perform the following steps:

displaying, by means of the selection menu, the information or data grouped by categories, so as to make the selection operation easier; and, depending on the category selected by the user:

locating and retrieving from memory 43 the requested data;

preparing the data according to a predetermined sequence (protocol), by inserting predetermined separation characters between the different values (formatting), for instance by formatting the data according to a known standard (for instance HTML);

queuing the data into a single text (string), for instance in ASCII format; and coding or converting the data into the QR bar code, for instance according to a known algorithm according to standard ISO/IEC18004.

Depending on the number of requested data and on the display 12 available in the machine, microprocessor circuit is arranged to code the data, through suitable procedures, into one or more QR codes capable of representing the ASCII string.

For instance, assuming that the user has selected a data category comprising in the whole 500 characters and that machine 10 has a 64×64 pixel display, a QR code with 256 characters at most can be displayed on display 12.

In such case, microprocessor circuit 40, according to the procedures implemented therein, is arranged to:

divide the data string preferably into two parts, of which the first one comprises for instance 256 characters and will be represented by a code QR1, and the second one comprises 500−256=244 characters and will be represented by a code QR2. Indeed, the QR code may be divided into sub-codes, for instance into up to a maximum of 16 sub-codes. Hence, an acquisition algorithm can reconstruct even very long data strings by queuing the data represented by the sequentially interpreted sub-codes of the QR code;

display QR codes QR1 and QR2 in sequence on display 12 of machine 10 for a predetermined period, for instance 15 sec, or for a period depending on a user's agreement operable through a selection menu.

In general, in order to complete the above steps, the QR code(s) is (are) photographed by means of device 50, for instance a smart-phone to which reference will be made hereinafter, arranged to:

recognise and decode the QR codes;

reconstruct the data string; and transmit at least the string as reconstructed to server 15 by using a predetermined address, for instance an Internet address.

In accordance with a first embodiment of the present invention, microprocessor circuit 40 is arranged to insert at the beginning of the string, in accordance with a predetermined protocol, information concerning the Internet address to which the data string is to be transmitted.

In this first exemplary embodiment, the user, equipped with smart-phone 50, is to take a picture of the string displayed on display 12 and, through a procedure usually provided in such device 50, to execute a command arranged to interpret or decode the QR code and to transmit the data as interpreted to the Internet address contained in the string.

In accordance with this first exemplary embodiment, the Internet address may also be an e-mail address, and also in this case a procedure usually provided in smart-phones can be used.

In accordance with a second embodiment, deemed as preferable, the smart-phone contains a specific application arranged both to decode the QR code and to insert into the decoded string further information that generally is not present in machine 10, such as for instance one or more of the following information items:

name and surname identifying the user and/or the company at whose premises the machine is installed;

date and time of QR code acquisition and decoding;

manner in which the user intends to transmit the data, for instance via web address or by e-mail;

web server or e-mail address to which the information string is to be transmitted;

geographical location of the smart-phone at the moment of the acquisition, for instance in case the smart-phone is equipped with geo-localisation functions;

notes that can be added depending on user-specific requirements;

other information.

In accordance with this second embodiment, such information or data, present in smart-phone 50 and not in machine 10, are added to the photographed and decoded string by the specific application.

Also in this case the application sends the data string to server 15, according to the modes chosen by the user.

The data, received for instance by the web server, are then interpreted taking into account the coding protocol within the string, and preferably they are stored into an information management database.

As it can be readily understood, the second embodiment may enable the user to include additional data besides the data supplied by the machine, without burdening the machine itself with further devices besides the specific devices required for the machine operation.

These data include, for instance, the data concerning the geo-localisation of the machine or the data arranged to identify the person or the company using the machine.

The operation of coffee machine 10 disclosed above is as follows.

In a first step 100 machine 10, under normal operation conditions or even under abnormal or emergency conditions, is arranged to collect and store, by means of electronic circuitry 14 and under the control of microprocessor circuit 40 of machine 10, information concerning usage parameters of the machine and/or information concerning possible abnormal conditions or maintenance interventions (data), as listed before.

In a second step 200, the machine makes available all parameters or data, or a determined set of machine parameters or data to the user, for instance through a menu displayed on display 12 or through a suitable machine key.

After step 200, in a third step 300 machine 10, under the control of microprocessor circuit 40, displays one or more QR codes in sequence on display 12, depending on whether the data can be displayed by means of a single QR code or a plurality of QR codes.

During such a step, CPU 41, suitably programmed, reads the data from store 43, checks, in a checking step 310, the type of display 12 installed on machine 10 and the amount of data to be coded, and prepares and codes the data string as a single QR code in step 320 (output Y from step 310) or as a plurality of QR codes in step 340 (output N from step 310), depending on the maximum resolution of display 12, and displays the QR codes on the display.

In a subsequent step 400, the user acquires the one or more QR codes by means of smart-phone 50, for instance through a photographic image, decodes them thereby reconstructing the data string in a step 500, and transmits them in a step 700, for instance to a web address or an e-mail address, so that the codes may for instance be stored and subsequently analysed.

In accordance with the second exemplary embodiment, the data string as decoded may be supplemented, in a step 600 preceding the transmission, for instance with information stored in the smart-phone memory or generated by the smart-phone (output Y from step 500), as disclosed hereinbefore, and then transmitted in step 700 jointly with the information stored in the smart-phone memory or generated by the smart-phone.

Preferably, the data transmitted are stored at a reference server, for instance a remote server, arranged to collect information from the machines arranged to transmit the information in the described manner.

Advantageously, thanks to the invention, machine 10 in system 9 lacks specific communication devices, since the latter are external to the machine.

Advantageously, the user is not to fill in paper forms and only is to select the set of information to be collected and, preferably, to take a picture of an image on a display.

Advantageously, all data requested by the user, without any exception, can be read and transmitted for a subsequent analysis.

Possibly, the data can also be stored in the smart-phone for being subsequently analysed by the user.

In synthesis, thanks to the system architecture disclosed, it is possible to achieve the technical effect of easily and automatically managing the information collected from the machine, without installing on the machine communication devices, which would make the machine complex and expensive.

The machine is only to include a display arranged to enable displaying bar codes representing information associated with the machine.

The additional functionalities, such as decoding the information contained in the bar code and transmitting the information possibly supplemented with information present, for instance, in the smart-phone, may be provided through suitable applications installed on the smart-phones themselves, thereby achieving the effect of meeting in simple and effective manner the need to monitor information related to the operation of the coffee machine.

Of course, changes and modifications to the above description in respect of the components, the circuit elements and the connections contacts, as well as in respect of the details of the illustrated construction and the operating manner are possible without departing from the scope of the invention as claimed in the following claims.

The invention claimed is:

1. Monitoring system for coffee machines, comprising:
   a remote server;
   at least one coffee machine having
      an electronic circuitry configured for collecting and storing usage parameters or data of the machine;
      a display having a certain resolution connected to the electronic circuitry;
      the electronic circuitry being configured for displaying on the display a menu for selection of the usage parameters or data of the machine or of a subset of such parameters or data by a user;
      the electronic circuitry being further configured for coding information relating to the usage parameters or data selected by the user or to the subset of such parameters or data selected by the user into one or more bar codes of QR code type as a function of a number of requested usage parameters or data and of the resolution of the display available in the machine;
      the display being further configured for displaying the information processed by the electronic circuitry in the form of the one or more bar codes of QR code type coded by the electronic circuitry;
      wherein the barcode of QR code type includes the information processed and coded by the electronic circuitry or each of the barcodes of QR code type includes a respective part of the information processed and coded by the electronic circuitry;

a device external to the machine and configured for
acquiring through photos the information processed and coded by the electronic circuitry and displayed on the display in the form of the one or more bar codes of the QR code type, decoding the one or more bar codes of QR code type displayed on the display and forming a data string; and transmitting the data string to the remote server.

2. The system according to claim 1, wherein the display is a graphical display, and the at least one bar code of QR code type includes a number of information compatible with the display mounted on the machine.

3. The system according to claim 1, wherein the usage parameters or data are selected from a group comprising at least:
supply data;
diagnostic data;
machine setting data;
maintenance data;
statistical data.

4. The system according to claim 1, wherein the device is a smart-phone.

5. The system according to claim 1, wherein the device is a smart-phone configured to insert into the data string additional information, other than the usage parameters or data of the machine, which additional information is contained in the device and selected from the group comprising at least:
identifiers of user and/or company where the machine is installed;
date and time of the bar code acquisition and decoding;
transmission mode of the data string;
web server or electronic mail address for transmitting the data string;
geographical position of the smart-phone when acquiring the information;
further notes depending on user-specific requirements.

6. The system according to claim 1, wherein the machine further comprises a user interface for the selection of the usage parameters or data of the machine or of a subset of such parameters or data from the menu.

7. Method for monitoring coffee machines in a system having:
a remote server;
at least one coffee machine with an electronic circuitry configured for collecting and storing usage parameters or data of the machine and at least one externally visible display having a certain resolution and connected to the electronic circuitry; and
a device external to the machine and arranged to exchange communications with the remote server;
said method comprising the steps of:
collecting and storing, by means of the machine, the usage parameters or data of the machine;
displaying on the display a menu for selection of the usage parameters or data of the machine or of a subset of such usage parameters or data by a user;

making available and coding information relating to the usage parameters or data selected by the user or to the subset of the usage parameters or data in the form of a single code or a plurality of codes as a function of a number of requested usage parameters or data and of the resolution of the display available in the machine, depending on whether the information relating to the usage parameters or data as requested can be displayed on the display by means of a single code or of a plurality of codes;

acquiring through photos the information processed and coded by the electronic circuitry and displayed on the display in the form of the one or more bar codes of the QR code type, by means of the device;

decoding the one or more bar codes of QR code type displayed on the display and forming a data string by means of the device; and transmitting the data string to the remote server by means of the device.

8. The method according to claim 7, wherein said step of decoding the one or more bar codes of QR code type displayed on the display and forming a data string by means of the device also comprises the further step of:
supplementing the requested usage parameter or data by inserting into the data string additional information, other than the usage parameters or data of the machine, which additional information is contained in the device and selected from the group comprising at least:
identifiers of user and/or company where the machine is installed;
date and time of the bar code acquisition and decoding;
transmission mode of the data string;
web server or electronic mail address for transmitting the data string;
geographical position of the device when acquiring the information;
further notes depending on user-specific requirements.

9. The method according to claim 7, wherein said step of displaying the one or more bar codes comprises the following steps executed by the electronic circuitry of the machine:
verifying the type of display installed on the machine and the quantity of information to be displayed; and, alternatively, depending on the maximum resolution of the display:
generating and displaying a single bar code; or
generating and displaying a plurality of bar codes on the display.

10. The method according to claim 8, wherein at least said steps of acquiring, decoding, and transmitting by means of the external device are operated by a smart-phone and the one or more bar codes of QR code type are adapted to be photographed by the smart-phone.

11. The method according to claim 7, wherein at least said steps of acquiring, decoding, and transmitting by means of the external device are operated by a smart-phone and the one or more bar codes of QR code type are adapted to be photographed by the smart-phone.

12. The method according to claim 7, wherein selection of the usage parameters or data of the machine or of the subset of such parameters or data from the menu is operated by a user interface provided by the machine.

* * * * *